United States Patent
Chub et al.

(10) Patent No.: US 9,223,766 B2
(45) Date of Patent: Dec. 29, 2015

(54) PRESERVING FORMATTING OF CONTENT SELECTION THROUGH SNIPPETS

(71) Applicant: MICROSOFT TECHNOLOGY LICENSING, LLC, Redmond, WA (US)

(72) Inventors: Sergey Chub, Redmond, WA (US); Raman Narayanan, Seattle, WA (US); Ming Liu, Bellevue, WA (US); Radoslav Nickolov, Seattle, WA (US); Wei Zeng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 13/684,030

(22) Filed: Nov. 21, 2012

(65) Prior Publication Data

US 2014/0143645 A1   May 22, 2014

(51) Int. Cl.
*G06F 17/21* (2006.01)
*G06F 17/22* (2006.01)
*G06F 17/24* (2006.01)

(52) U.S. Cl.
CPC .......... *G06F 17/2235* (2013.01); *G06F 17/24* (2013.01)

(58) Field of Classification Search
CPC ...................................................... G06F 17/24
See application file for complete search history.

(56) References Cited

U.S. PATENT DOCUMENTS

| | | | |
|---|---|---|---|
| 7,509,345 B2 | 3/2009 | DeSpain et al. | |
| 7,519,573 B2 | 4/2009 | Helfman et al. | |
| 7,962,846 B2 | 6/2011 | Lerner et al. | |
| 2004/0139400 A1 | 7/2004 | Allam et al. | |
| 2006/0041589 A1* | 2/2006 | Helfman et al. | 707/104.1 |
| 2006/0075353 A1* | 4/2006 | DeSpain et al. | 715/770 |
| 2006/0277482 A1 | 12/2006 | Hoffman et al. | |
| 2007/0106952 A1 | 5/2007 | Matas et al. | |
| 2008/0196040 A1 | 8/2008 | Mochel et al. | |
| 2008/0294981 A1 | 11/2008 | Balzano et al. | |
| 2012/0146923 A1* | 6/2012 | Basir | 345/173 |

OTHER PUBLICATIONS

"Reading on Kindle 1st Generation", Retrieved at <<http://www.amazon.com/gp/help/customer/display.html?nodeId=200127490>>, Aug. 30, 2012, pp. 4.

Tofel, Kevin C., "Sony outs New Reader PRS-T2 with Evernote, Facebook sharing", Retrieved at <<http://gigaom.com/mobile/sony-outs-new-reader-prs-t2-with-evernote-facebook-sharing/>>, Aug. 16, 2012, pp. 12.

"Evernote for Mac User Guide", Retrieved at <<http://evernote.com/support/Evernote-Mac-Guide.pdf>>, Aug. 30, 2012, pp. 35.

(Continued)

*Primary Examiner* — Scott Baderman
*Assistant Examiner* — Asher Kells
(74) *Attorney, Agent, or Firm* — Jessica Meyers; Jim Ross; Micky Minhas

(57) ABSTRACT

An e-reader application preserves formatting of a selection through a snippet. The application determines a format of a portion of content in response to a user action selecting the portion. The formatted portion is stored in the snippet. The source code of the portion is extracted from the content and stored in the snippet to preserve its format. The snippet is displayed in a navigation pane using the format. The snippet is resized according to the defined format to fit available space in the navigation pane. The application is enabled to navigate to a location of the portion within the content in response to detecting another selection activating the snippet.

18 Claims, 6 Drawing Sheets

(56) References Cited

OTHER PUBLICATIONS

"International Search Report & Written Opinion for PCT Patent Application No. PCT/US2013/071058", Mailed Date: Jul. 1, 2014, Filed Date: Nov. 20, 2013, 12 Pages.

Buchanan, George, "Rapid Document Navigation for Information Triage Support", In Proceedings of the 7th ACM/IEEE-CS joint conference on Digital libraries, Jun. 18, 2007, p. 503.

Buchanan, et al., "Improving Navigation Interaction in Digital Documents", In Proceedings of the 8th ACM/IEEE-CS joint conference on Digital libraries, Jun. 16, 2008, pp. 389-392.

* cited by examiner

FIG. 3

Amendment I

Congress shall make no law respecting an establishment of religion, or prohibiting the free exercise thereof; or abridging the free of speech, or of the press; or the right of the people peaceably to assemble, and to petition the Government for a redress of grievances

Amendment II

A well regulated Militia, being necessary to the security of a free State, the right of the people to keep and bear Arms, shall not be infringed

Amendment III

No Soldier shall, in time of peace be quartered in any house, without the consent of the Owner, nor in time of war, but in a manner to be prescribed by law.

Amendment VI

In all criminal prosecutions, the accused shall enjoy the right to a speedy and

FIGURE 2

ARTICLES in addition to, and Amendment of the Constitution of the United States of America, proposed by Congress, and ratified by the Legislatures of the several States, pursuant to the fifth Article of the original Constitution.

preserved, and no fact tried by a jury, shall be otherwise re-examined in any Court of the United States, than according to the rules of the common law.

ARTICLES in addition to, and Amendment of the Constitution of the United States of America, proposed by Congress, and ratified by the Legislatures of the several States, pursuant to the fifth Article of the original Constitution.

PRESERVING FORMATTING OF CONTENT SELECTION THROUGH SNIPPETS

BACKGROUND

Mobile computing has transformed media consumption across markets. Miniaturization across product generations has enabled more functionality to be accomplished by smaller devices. A modern smartphone has more computing capacity than a desktop computer a few years ago. Mature product processes have also enabled advances in technology to be integrated to automated production of mobile devices seamlessly. Extensive automation has led to inexpensive components. Inexpensive components have enabled manufacturing of inexpensive mobile devices providing functionality on the go.

Content selection and consumption solutions are limited endeavors in modern mobile solutions. A typical content selection in legacy solutions involves capturing text associated with the content. Text formatting usually is not carried over to application consuming the content. Some solutions to text format transportation are available to varied success. Complex text with style attributes are transportable to consuming applications if the consuming application supports the formats specified by the transport operation. However, selection and transportation of complex content is still an area lacking in reproduction fidelity. Most complex content is transported as image clips. Reproduced images are quality restricted to limit resource and memory utilization. Reproduction rarely ever achieves the quality of original content. In addition, most mobile solutions lack the ability to provide interaction features with the clip during transport to consuming application.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to preserving formatting of content selection through a snippet. According to embodiments, an e-reader application may detect a selection of a portion of content. The selection may be detected as a result of a user interaction with a user interface of the application displaying the content. The portion may be composed of multiple objects including text and/or graphics. The portion and its format may be stored as a snippet. The snippet may be a container to retain the formatted content portion. In addition, the snippet may be displayed in a navigation pane in its original format while fitting to available space in the navigation pane. In response to detecting another action activating the snippet, the application may navigate to a location of the portion within the content. A page of the content containing the portion may be displayed if not in active view already.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 3 illustrates another example e-reader displaying a snippet while away from the content used to create the snippet according to embodiments;

DETAILED DESCRIPTION

Figure 1:
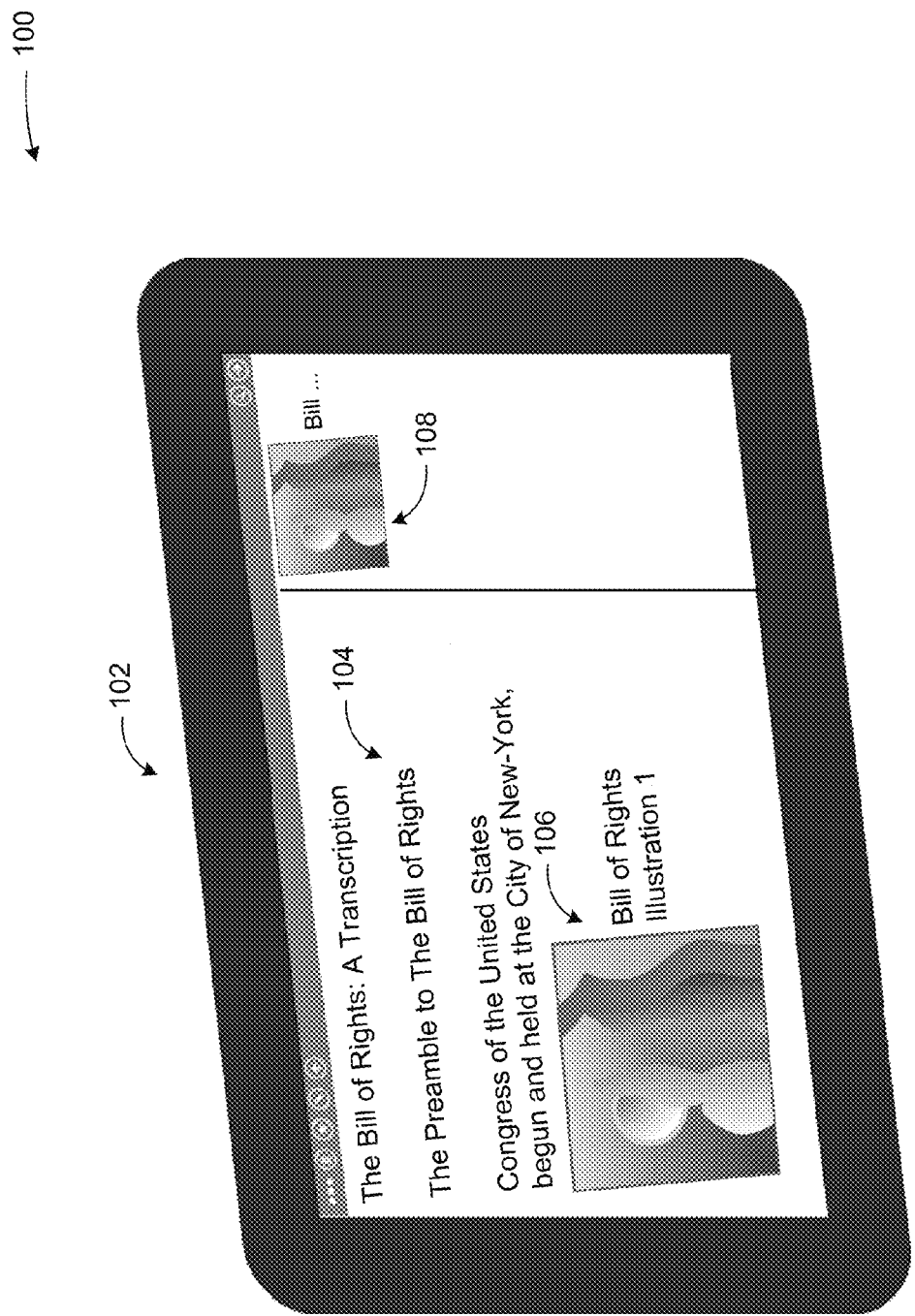
FIG. 1 illustrates an example architectural diagram of preserving formatting of a selection through a snippet in an e-reader according to some embodiments.

As briefly described above, formatting of a selection may be preserved through a snippet. An application of an e-reader device may store a portion of content and its format as a snippet in response to a user selection. A user interface element showing the snippet may be used to navigate to a location of the content in response to selection of the snippet displayed in a navigation pane.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for preserving formatting of a selection through a snippet. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example architectural diagram of preserving formatting of a selection through a snippet in an e-reader according to embodiments. The components and environments shown in diagram 100 are for illustration purposes. Embodiments may be implemented in various local, networked, cloud-based and similar computing environments employing a variety of computing devices and systems, hardware and software.

An "e-reader" device such as a tablet 102 may host an application providing content 104 to a user. Such an application may be called an e-reader application, which may be a locally installed and executed application receiving content (e.g., e-books, documents, etc.) through wired or wireless networks. The e-reader application may also be a hosted service provided by one or more servers and accessed by a user through the e-reader device (e.g., tablet 102). Content may be any type of consumable data including but not exclusive to text, audio, video, graphic, etc. Content may also include media combinations presented in a standardized format (e.g., a web page.)

A user may interact with the content 104 through a variety of control devices. The tablet 102 may be enabled to detect a pen, a touch, a mouse, a keyboard, an audio, and a video based input. The tablet 104 may also detect a combination input such as a gesture. The application may preserve formatting of a selected portion 106 of the content. The format may be implemented using a standard including hyper-text markup language (HTML). The format may define size and location of the portion 106 within the content 104. The format may also define size, location, and display attributes of components of the portion 106. In an example scenario, the format may specify for highlighted text while emphasizing a graphic component using shading. In response the detecting the selection, the portion 106 and its format may be stored as a snippet 108. The snippet 108 may be displayed in a navigation pane for quick access by a user. The displayed snippet may be activated by the user to navigate to a location of the portion in the content. An example may include displaying a page containing the portion after activation of the snippet while displaying another page.

Embodiments are not limited to implementation in a tablet 102. An application according to embodiment may enable a user to preserve a format of a selection through a snippet in other platforms. A user may be enabled to store a snippet in any device capable of displaying the content. A touch or gesture enabled device (although suitable) is not necessary. A user may be enabled to store a snippet using a standard mouse and keyboard interface.

Figure 2:
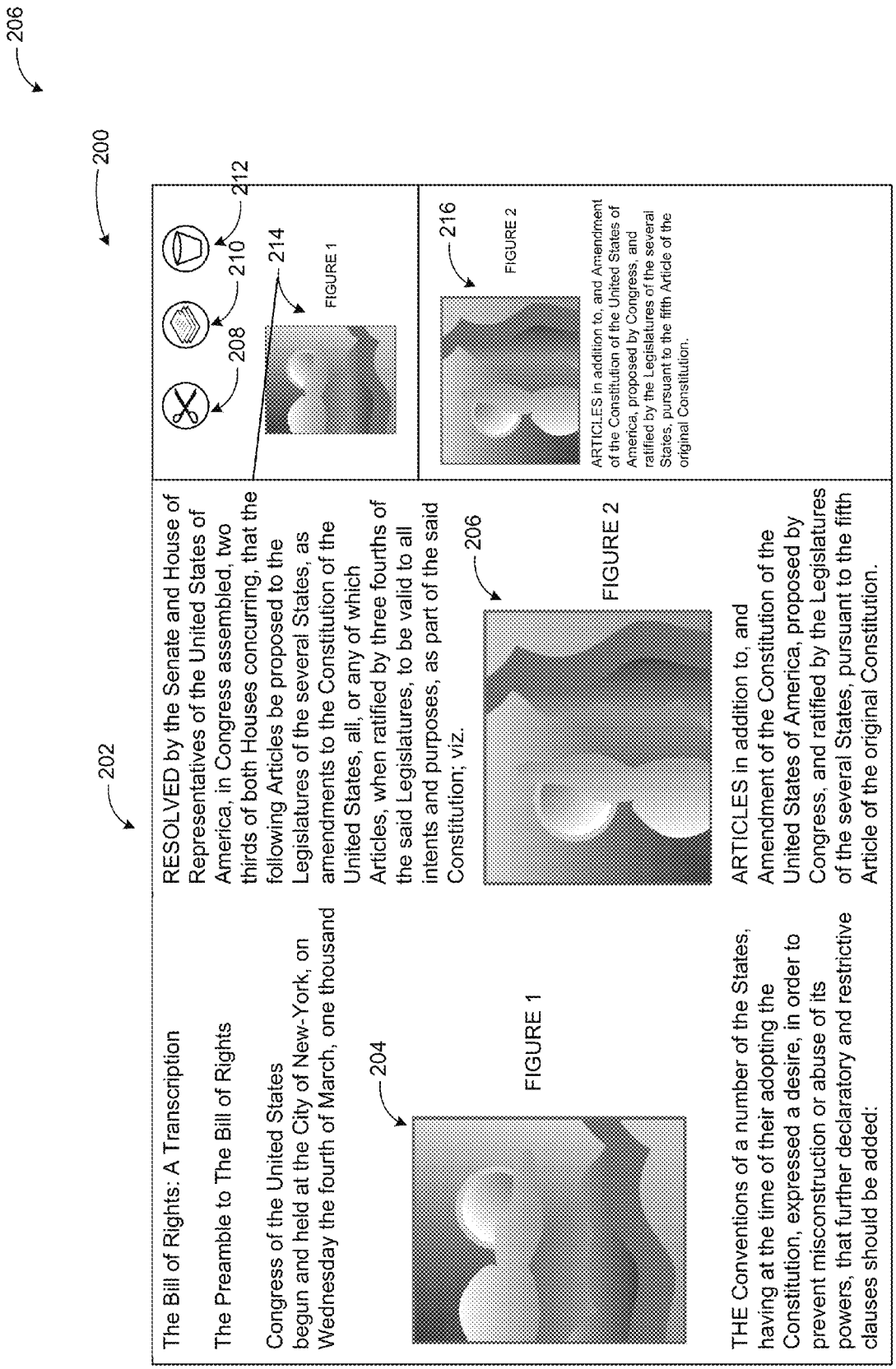
FIG. 2 illustrates an example e-reader preserving formatting of a selection through a snippet according to embodiments.

FIG. 2 illustrates an example e-reader preserving formatting of a selection through a snippet according to embodiments. Diagram 200 displays selected portions preserved through snippets.

An application of an e-reader device may display content through a user interface 202. The user interface 202 may display content according to a detected format. The content may be formatted using a standard such as HTML. The HTML formatting may be used to define display attributes of components within the content. In an example scenario, an image may be resized based on a proportion of the display screen defined by HTML. In another example scenario, text may be stylized based on font attributes defined by HTML.

A portion 204 of the content may be stored in a snippet 214 while preserving the portion's format in response to a user action. The user action may be a selection of the portion 214. The portion 214 may be selected through any combination of a user action including touch or mouse/keyboard based input. In an example scenario, a user may select the portion 204 through a touch and hold action. The user may touch a snippet control 208 to create the snippet 214. A user is not limited to a touch based input to select the portion 204 and create the snippet 214. Alternatively, the user may select the portion 204 using a mouse input and activate the snippet control 208 to create the snippet 214.

The e-reader application may create another snippet 216 according to another user action selecting the portion 206. A snippet control may be displayed in response to the user selecting the portion 206. The application may create the snippet 216 in response to a user activating the snippet control 208.

Format of the selected portion 206 may be determined for storage in the snippet 216. The format may be analyzed to determine utilized standards including HTML, extensible markup language (XML), and others. A source code of the portion may be extracted from the content to store the portion using the detected format. The source code may be embedded in a document containing the content. The application may initialize an application programming interface (API) capable of extracting source code in the detected format. The source code may be stored in the snippet as the formatted portion.

Additional controls may be displayed by a user interface of the application to manage snippets. A navigation control 210 may be used to navigate to a page containing the portion associated with a selected snippet. A delete control 212 may be used to delete a selected snippet.

The snippets 214 and 216 may be displayed in the navigation view while preserving the format of the portion associated with the snippets. The stored portion may be decoded using the detected format to determine size, location, and shape of components within the portion. The components may be detected to include textual, image, audio, video, and graphical objects. The components may be resized to fit available space in the navigation pane. The snippet may be displayed in the navigation pane using the resized components.

The application may enable a user to capture multiple portions from different locations in the content and store the portions as one snippet. In an example scenario, a selection of another portion may be detected from a different location such as an adjacent column within the content. Upon a user action to create the snippet, the application may store both portions in the snippet while preserving the formats of both portions. The snippet may be displayed in the navigation pane using resized portions separated by a divider such as a line.

The navigation pane may be used as a directory. The application may auto-generate snippets for predetermined locations within the content. The user may be enabled to navigate to the locations by selecting a snippet. The application may also allow a user to alter the directory of snippets by adding a snippet as a custom reference to a location of another portion of the content. The application may also enable deletion of an existing snippet to remove a location reference from the directory.

FIG. 3 illustrates another example e-reader displaying a snippet while away from the content used to create the snippet according to embodiments. Diagram 300 displays a view pane 308 presenting the snippet 304.

The application may detect a user action selecting the snippet 304 while displaying other content. The other content may be a page within the content that does not contain the portion stored by the snippet 304. Alternatively, the other content may be a different document that may have the snippet inserted into a location of the document for annotation.

A user action selecting the snippet may apply a graphical scheme to the snippet 304. A selection may be reflected through a display scheme 306 illustrating the selection. The display scheme 306 may include encircling the snippet with a shape including a circle, a rectangle, a square, a trapezoid, etc.

In response to selecting the snippet while displaying content that does not contain the portion stored in the snippet, the application may display a view pane 308. The view pane 308 may display the portion formatted based on the stored format. The view pane 308 may display the portion in an original size of the content associated with the portion. Alternatively, the application may resize the portion to fit an available size of the view pane. The size of the view pane may be restricted according to available display size and/or other e-reader device settings.

Snippets from the content may be inserted to other content. The other content may include a separate document than the document containing the content. A snippet from the content may be inserted to the other content to annotate the other content with the portion stored in the snippet. The snippet may be automatically inserted to a related location in the other content. The related location may be automatically determined by matching the components in the portion stored in the snippet with components of the other content. Alternatively, a user may be enabled to manually insert the snippet to a location of choice within the other content.

In response to a user action selecting the snippet displayed in the navigation pane, the application may display a view pane displaying the portion stored in the snippet. The portion may be formatted according to the format stored in the snippet, as discussed previously.

In addition, the snippet may be displayed according to a scheme. A 3D scheme, a shading scheme, a color scheme, a textual scheme, a graphical scheme, and others may be applied to differentiate the snippet from the content. The scheme may be applied in the navigation pane. Alternatively, separate schemes may be applied to a selected snippet compared to other displayed schemes in the navigation pane. In an example scenario, a selected snippet 308 may be displayed using a 3D scheme distinguishing the selected snippet 308 from adjacent snippets. Furthermore, a display scheme may also be applied to the portion displayed in the view pane 308. The display scheme may differentiate the portion from content displayed underneath the view pane.

Likewise, snippets may be shared in social networks, professional networks, blogs, etc. Controls in an e-reader application may enable storing and insertion of the snippet from the content into a networking site. The snippet may be inserted into a location in the networking site to annotate the networking site. The snippet may be published to the networking site using controls embedded in the navigation pane. The content hosting the portion may be displayed in response to a user action such as activation of a control to navigate to the content.

The example scenarios and schemas in FIG. 2 through 3 are shown with specific components, data types, and configurations. Embodiments are not limited to systems according to these example configurations. Preserving formatting of a selection through a snippet in an e-reader may be implemented in configurations employing fewer or additional components in applications and user interfaces. Furthermore, the example schema and components shown in FIG. 2 through 3 and their subcomponents may be implemented in a similar manner with other values using the principles described herein.

Figure 4:
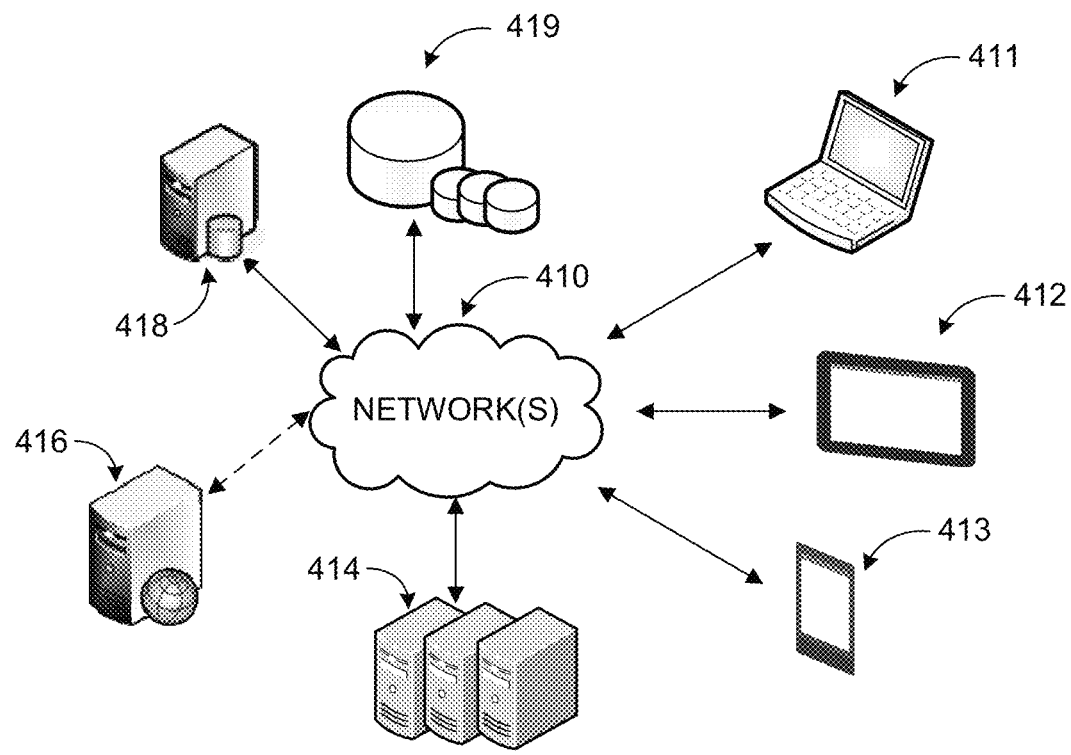
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application may execute on individual computing devices such as a smart phone 413, a tablet device 412, or a laptop computer 411 ('client devices') and communicate with content storage through network(s) 410.

As discussed above, an e-reader application may detect a selection action to store a portion of the content in a snippet. The snippet may also store a format of the portion. The application may restore the formatting of the portion while displaying the snippet. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to preserve formatting of a selection through a snippet in an e-reader. Furthermore, the networked environments discussed in FIG. 4 are for illustration purposes only. Embodiments are not limited to the example applications, modules, or processes.

Figure 5:
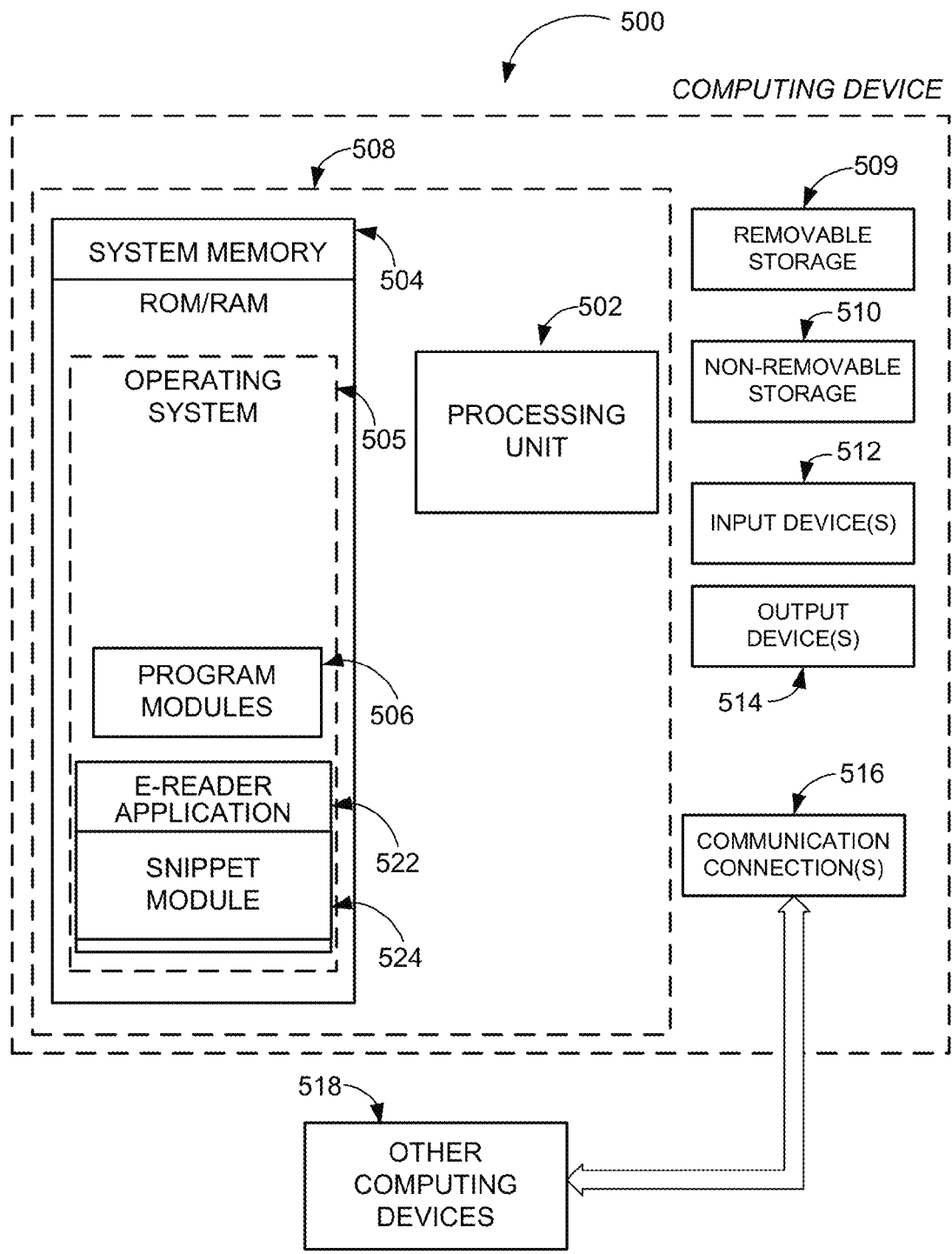
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® and WINDOWS PHONE® operating systems from MICROSOFT CORPORATION of Redmond, Wash. The system memory 504 may also include one or more software applications such as program modules 506, an e-reader application 522, and a snippet module 524.

An e-reader application 522 may detect a selection of a portion of content. The snippet module 524 may determine a format of the portion and store the portion and the format as a snippet. The application 522 may navigate to a location of the portion within the content in response to detecting another selection activating the snippet displayed in a navigation pane. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
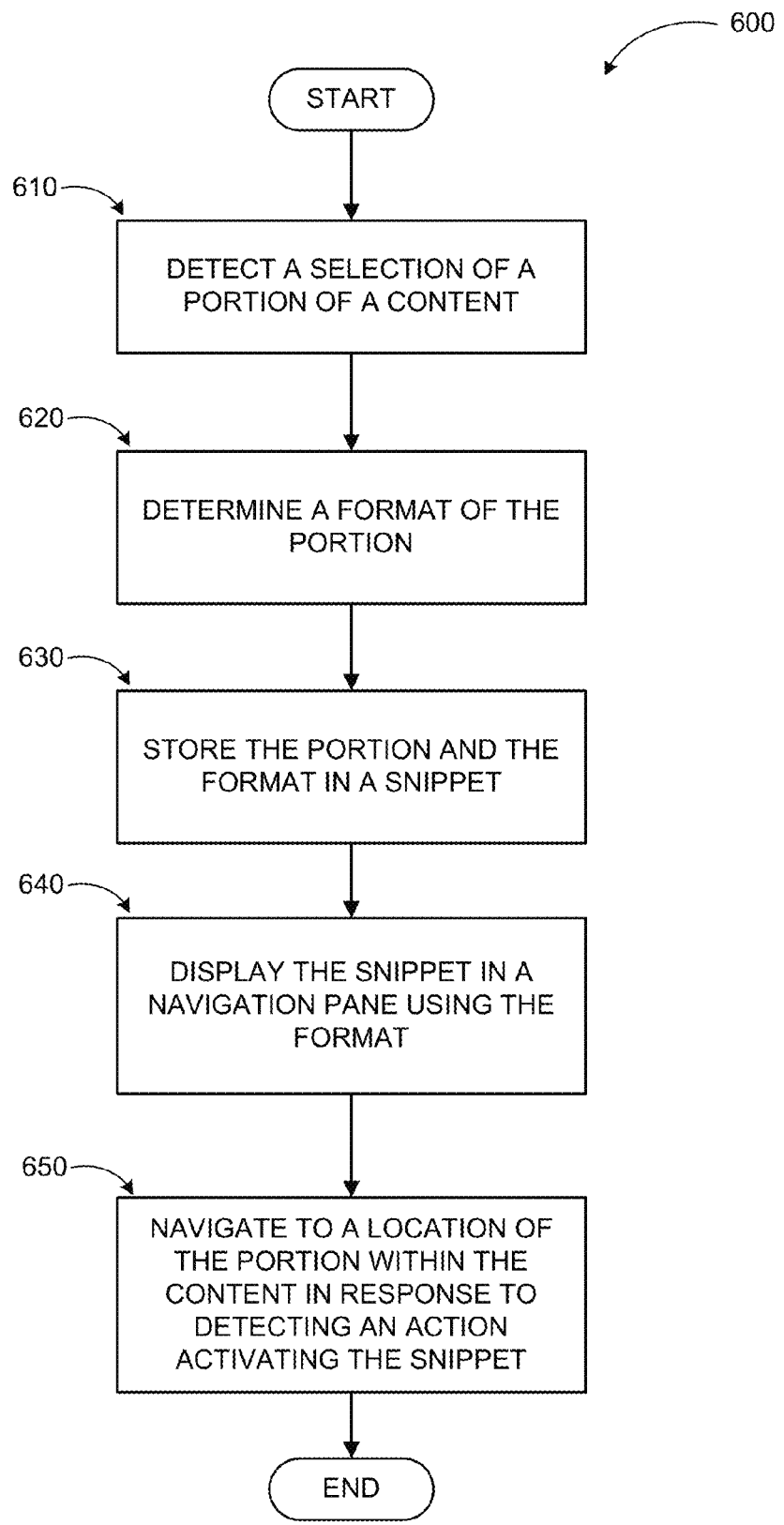
FIG. 6 illustrates a logic flow diagram for a process preserving formatting of a selection through a snippet in an e-reader according to embodiments.

FIG. 6 illustrates a logic flow diagram for a process preserving formatting of a selection through a snippet in an e-reader according to embodiments. Process 600 may be implemented by an e-reader application in some examples.

Process 600 may begin with operation 610 where the e-reader application may detect a selection of a portion of content. A user action such as touch based input may select the portion. The application may determine a format of the portion at operation 620. The portion may be formatted using a standard such as HTML. The format may describe display attributes of the components of the portion. At operation 630, the portion and the format may be stored as a snippet. The snippet may be anchored to a location associated with the portion. The snippet maybe displayed in a navigation pane using the format at operation 640. The source code contained in the snippet may be decoded using the format to determine display criteria for the components of the portion. Next, the application may navigate to a location of the portion within the content in response to detecting another selection activating the snippet at operation 650. The snippet may be used as a control for navigation and for launching a view pane when displaying other content that does not contain the portion.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Preserving formatting of a selection through a snippet, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for preserving formatting of content selection through a snippet, the method comprising:
   detecting a selection of a portion of a first content;
   determining a format of the selected portion;
   storing the selected portion and the format as a snippet;
   displaying the snippet in a navigation pane preserving the format;
   navigating to a location of the selected portion within the first content in response to detecting an action activating the snippet;
   determining a related location in a second content by matching components in the selected portion stored in the snippet with components of the second content; and
   inserting the snippet into the second content at the related location to annotate the second content with the selected portion stored in the snippet.

2. The method of claim 1, further comprising;
evaluating the format in at least one of: hyper-text markup language (HTML) and extensible markup language (XML).

3. The method of claim 1, further comprising:
initializing an application programming interface (API) associated with the format; and
extracting a source code of the selected portion from the first content using the API.

4. The method of claim 3, further comprising:
storing the source code as the formatted portion in the snippet.

5. The method of claim 1, further comprising:
decoding the selected portion using the format; and
determining at least one of a size, a location, and a shape of at least one component in the decoded portion.

6. The method of claim 5, further comprising:
detecting at least one of: a textual, an image, an audio, a video, and a graphical object as the at least one component; and
resizing the at least one component to fit an available space in the navigation pane.

7. The method of claim 1, further comprising:
detecting another selection of another portion from a different location in the first content;
storing the other selected portion in the snippet along with the selected portion; and
separating the selected portion and the other selected portion with a divider while displaying the snippet in the navigation pane.

8. The method of claim 1, further comprising:
utilizing the navigation pane as a directory;
using auto-generated snippets in the directory as references to predetermined locations in the first content; and
adding the snippet to the auto-generated snippets in the navigation pane as a custom reference.

9. The method of claim 1, further comprising:
displaying a snippet control in the navigation pane; and
storing the selected portion in the snippet in response to another action activating the snippet control.

10. The method of claim 1, further comprising:
displaying a delete control in the navigation pane;
detecting another selection selecting the snippet; and
deleting the snippet in response to another action activating the delete control.

11. The method of claim 1, further comprising:
displaying a navigation control in the navigation pane;
detecting another selection of the snippet; and
navigating to a page of the first content storing the selected portion associated with the snippet in response to another action activating the navigation control.

12. A computing device for preserving formatting of content selection through a snippet in an e-reader, the computing device comprising:
a memory configured to store instructions; and
a processor coupled to the memory, the processor executing an application in conjunction with the instructions stored in the memory, wherein the application is configured to:
detect a selection of a portion of a first content displayed on a main view pane;
determine a format of the selected portion;
store the selected portion and the format as the snippet;
display the snippet in a navigation pane preserving the format of the selected portion;
display the selected portion in a side view pane in response to an action selecting the snippet while presenting a second content on the main view pane;
determine a related location in the second content by matching components in the selected portion stored in the snippet with components of the second content; and
insert the snippet into the second content at the related location to annotate the second content with the selected portion stored in the snippet.

13. The computing device of claim 12, wherein the application is further configured to:
format the selected portion to a size including one of; an original size defined by the format and a proportional size to fit the side view pane.

14. The computing device of claim 12, wherein the application is further configured to:
apply a display scheme to the snippet including at least one of: a 3D scheme, a shading scheme, a color scheme, a textual scheme, a graphical scheme; and
apply another display scheme to the snippet including; at least one of a highlighting, as circle shape, a rectangle shape, a square shape, and as trapezoid shape in response to the selection of the snippet.

15. A method executed on a computing device for preserving formatting of content selection through a snippet in an e-reader, the method comprising:
detecting a selection of a portion of a first content;
determining a format of the selected portion;
initializing an application programming interface (API) associated with the format;
extracting a source code of the selected portion from the first content using the API;
storing the source code in a snippet;
displaying the snippet in a navigation pane using the format;
navigating to at location of the selected portion within the first content in response to detecting an action activating the snippet;
determining a related location in a second content by matching components in the selected portion stored in the snippet with components of the second content; and
inserting the snippet into the second content at the related location to annotate the second content with the selected portion stored in the snippet.

16. The method of claim 15, further comprising:
posting the snippet to a website including at least one of: a social networking site, a professional networking site, and a blog.

17. The method of claim 16, further comprising:
posting the snippet to the website as an annotation.

18. The method of claim 17, further comprising:
publishing the snippet to the website using at least one control embedded in the navigation pane.

* * * * *